US008061756B2

(12) United States Patent
Kimata et al.

(10) Patent No.: US 8,061,756 B2
(45) Date of Patent: Nov. 22, 2011

(54) ELECTRICALLY OPERATED SEAT SLIDE APPARATUS

(75) Inventors: Toshihiro Kimata, Toyohashi (JP); Takaya Kanazawa, Kosai (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 322 days.

(21) Appl. No.: 12/402,036

(22) Filed: Mar. 11, 2009

(65) Prior Publication Data
US 2009/0243326 A1    Oct. 1, 2009

(30) Foreign Application Priority Data

Mar. 31, 2008 (JP) .................................. 2008-089413
Mar. 31, 2008 (JP) .................................. 2008-089414

(51) Int. Cl.
*B60N 2/02* (2006.01)
(52) U.S. Cl. .................. 296/65.17; 296/65.13; 248/429; 248/430; 297/330
(58) Field of Classification Search ................ 296/65.15, 296/65.14, 65.13; 248/429, 430; 297/344.1, 297/330
See application file for complete search history.

(56) References Cited

U.S. PATENT DOCUMENTS

| 4,721,337 A * | 1/1988 | Tomita ........................... 248/429 |
| 6,361,109 B1 * | 3/2002 | Tokarz et al. ............. 297/344.15 |
| 7,303,223 B2 * | 12/2007 | Nakamura et al. .......... 296/65.15 |
| 7,712,816 B2 * | 5/2010 | Ujimoto et al. ................ 296/75 |

FOREIGN PATENT DOCUMENTS

| JP | 9-123807 A | 5/1997 |
| JP | 10-203209 A | 8/1998 |
| JP | 2001-239861 A | 9/2001 |
| JP | 2006-335153 A | 12/2006 |

* cited by examiner

*Primary Examiner* — Lori Lyjak
(74) *Attorney, Agent, or Firm* — Foley & Lardner LLP

(57) ABSTRACT

An electrically operated seat slide apparatus includes a lower rail fixed to a floor of a vehicle body, and an upper rail slidably disposed to the lower rail. A seat is connected to the upper rail. A screw shaft is disposed inside the upper rail. A nut is threadedly connected to the screw shaft and connected to the lower rail. A motor is disposed to side of the upper rail. A gear box is fixed to the upper rail to transmit a rotation of the motor to the screw shaft. Additionally, first and second plates are provided for allowing an impact load applied to the upper rail to be directly transmitted to the screw shaft so as to prevent the impact load from being transmitted through the gear box to the screw shaft, and for setting a moving range of the nut.

15 Claims, 6 Drawing Sheets

ELECTRICALLY OPERATED SEAT SLIDE APPARATUS

BACKGROUND OF THE INVENTION

This invention relates to an electrically operated seat slide apparatus, and more particularly to the seat slide apparatus having a device for directly transmitting an impact applied to an upper rail to a lower rail without transmitting to a gear box.

Seat slide apparatuses are classified into manually operated seat slide apparatuses and electrically operated seat slide apparatuses. The manually operated seat slide apparatuses are arranged to manually move a seat in a fore-and-aft direction, whereas the electrically operated seat slide apparatuses are arranged to move a seat in a fore-and-aft direction by a rotational force of an electric motor.

One of the electrically operated seat slide apparatuses is disclosed in Japanese Patent Provisional Publication No. 2001-239861. In this electrically operated seat slide apparatus, an upper rail to which a seat is connected is disposed inside a lower rail fixed to a vehicle body. A screw shaft is rotatably disposed inside the upper rail. Two of such a combination of the upper rail, the lower rail and the screw shaft are respectively disposed parallel both on left and right sides. The screw shafts are connected to an electric motor disposed at one of the upper rails so as to be rotationally driven in timed relation to each other. A nut member is threadedly connected to each screw shaft and further connected to the lower rail. Stoppers are connected to each screw shaft at the positions near the opposite ends of the screw shaft by being caulked in order to restrict the movement of the nut member.

In order to allow a high load applied to the upper rail during a collision to be transmitted through the screw shaft to lower rail, two flanges are fixed on the screw shaft and located spaced apart a certain small distance from each other, and a load receiving member is connected to the upper rail and interposed between the two flanges. This load receiving member is fitted in a fitting opening formed in the upper rail and fixed therein by a push-nut or the like.

Japanese Patent Provisional Publication No. 2006-335153 discloses another electrically operated seat slide apparatus in which the upper section of a rail-side stopper is bifurcated to form two stopper plate portions which are respectively fitted in fixation openings of an upper rail and caulked to be fixed in positions.

A further electrically operated seat slide apparatus is disclosed in Japanese Patent Provisional Publication No. 9-123807. In this electrically operated seat slide apparatus, an upper rail to which a seat is connected is disposed inside a lower rail fixed to a vehicle body. A motor is disposed to the upper rail so as to simultaneously rotationally drive two screw shafts which are located respectively on right and left sides of a seat. Two nut members connected to the lower rails are respectively threadedly connected to the right and left side screw shafts. Additionally, two stoppers are connected to each screw shaft at its positions near the opposite ends by caulking the screw shaft, in order to stop a relative movement of the nut member.

Japanese Patent Provisional Publication No. 10-203209 discloses a further electrically operated seat slide apparatus in which a damper is disposed on a lead screw and located on the side of a nut member. The damper is interposed between a damper holding section and a nut member-side plate. When the nut member strikes against the nut member-side plate, the nut member-side plate relatively rotates to the damper so that no torsion is applied to the damper.

SUMMARY OF THE INVENTION

However, the electrically operated seat slide apparatus disclosed in Japanese Patent Provisional Publication No. 2001-239861 encounters the following problems: When an impact load is applied to the upper rail, the load receiving member fixed to the upper rail is pushed onto the flange, and therefore the load receiving member fixed to the upper rail is pressed in an axial direction of the upper rail. As a result, there is the fear that the load receiving member is bent and gets off from the upper rail. Further, there is a defect that the number of parts increases by that corresponding to the push-nut. Furthermore, a part of the screw shaft between a gear box and the two flanges undergoes a compression or a tension, and therefore there is the fear that the screw shaft is buckled when receiving the compression.

Additionally, the electrically operated seat slide apparatus disclosed in Japanese Patent Provisional Publication No. 2006-335153 encounters a problem that the rail-side stopper is compressed and buckled to be bent when the stopper plate portions of the rail-side stopper are vertically compressed to be caulked.

Further, the electrically operated seat slide apparatus disclosed in Japanese Patent Provisional Publication No. 9-123807 encounters the following problem: When the nut member strikes against the stopper, the nut member strikes against the stopper which is rotating, so that a torsion is applied to the stopper.

Japanese Patent Provisional Publication No. 10-203209 may solve the problem encountered in the above seat slide apparatus in Japanese Patent Provisional Publication No. 9-123807. However, in this seat slide apparatus, it is required to provide the damper to the lead screw, together with the damper holding section and the nut member-side plate, thereby increasing the number of parts. Such increase in parts number lowers an assembly workability of the seat slide apparatus. Additionally, although such an electrically operated seat slide apparatus is eagerly required to be small-sized and light-weighted, it is difficult to reduce the sectional area of an upper rail in such a structure that the lead screw is disposed inside the upper rail, for the reason why a member for supporting the nut member is required to be disposed inside the upper rail because the nut member must be supported to the lower rail in the state of being surrounded by a damper in order that the nut member can be movable vertically and laterally so as to absorb the dispersion in dimensions in vertical and lateral directions of the upper and lower rails.

In view of the above, an object of the present invention is to provide an improved electrically operated seat slide apparatus by which an impact load applied to an upper rail is allowed to be directly transmitted to a screw shaft so as to prevent the impact load from being transmitted through a gear box to the screw shaft, and for setting a moving range of the nut.

Another object of the present invention is to provide an improved electrically operated seat slide apparatus having a rail-side stopper which cannot be buckled even upon caulking and is endurable to a bending moment by an axial force, preventing a screw shaft from being buckled.

A further object of the present invention is to provide an improved electrically operated seat slide apparatus which can effectively overcome drawbacks encountered in conventional electrically operated seat slide apparatuses.

According to the present invention, an electrically operated seat slide apparatus comprises a lower rail having a generally U-shape cross-section and fixed to a floor of a vehicle body, and an upper rail having a generally reversed U-shape cross-section and slidably disposed to the lower rail, a seat being connected to the upper rail. A screw shaft is disposed inside the upper rail and extends in a direction of length of the upper rail. A nut is threadedly connected to the screw shaft and connected to the lower rail. A motor is disposed to side of the upper rail. A gear box is located around an axis of the screw shaft and fixed to the upper rail to transmit a rotation of the motor to the screw shaft. Additionally, first and second plates are provided for allowing an impact load applied to the upper rail to be directly transmitted to the screw shaft so as to prevent the impact load from being transmitted through the gear box to the screw shaft, and for setting a moving range of the nut.

The other objects and features of this invention will become understood from the following description with reference to the accompanying drawings.

BRIEF DESCRIPTION OF THE DRAWING

In the drawings, like reference numerals designate like parts and elements throughout all figures.

DETAILED DESCRIPTION OF THE INVENTION

Referring now to FIGS. 1 to 7, an embodiment of an electrically operated seat slide apparatus according to the present invention is illustrated. The electrically operated seat slide apparatus is mounted on a vehicle body, for example, of an automotive vehicle.

Figure 6:
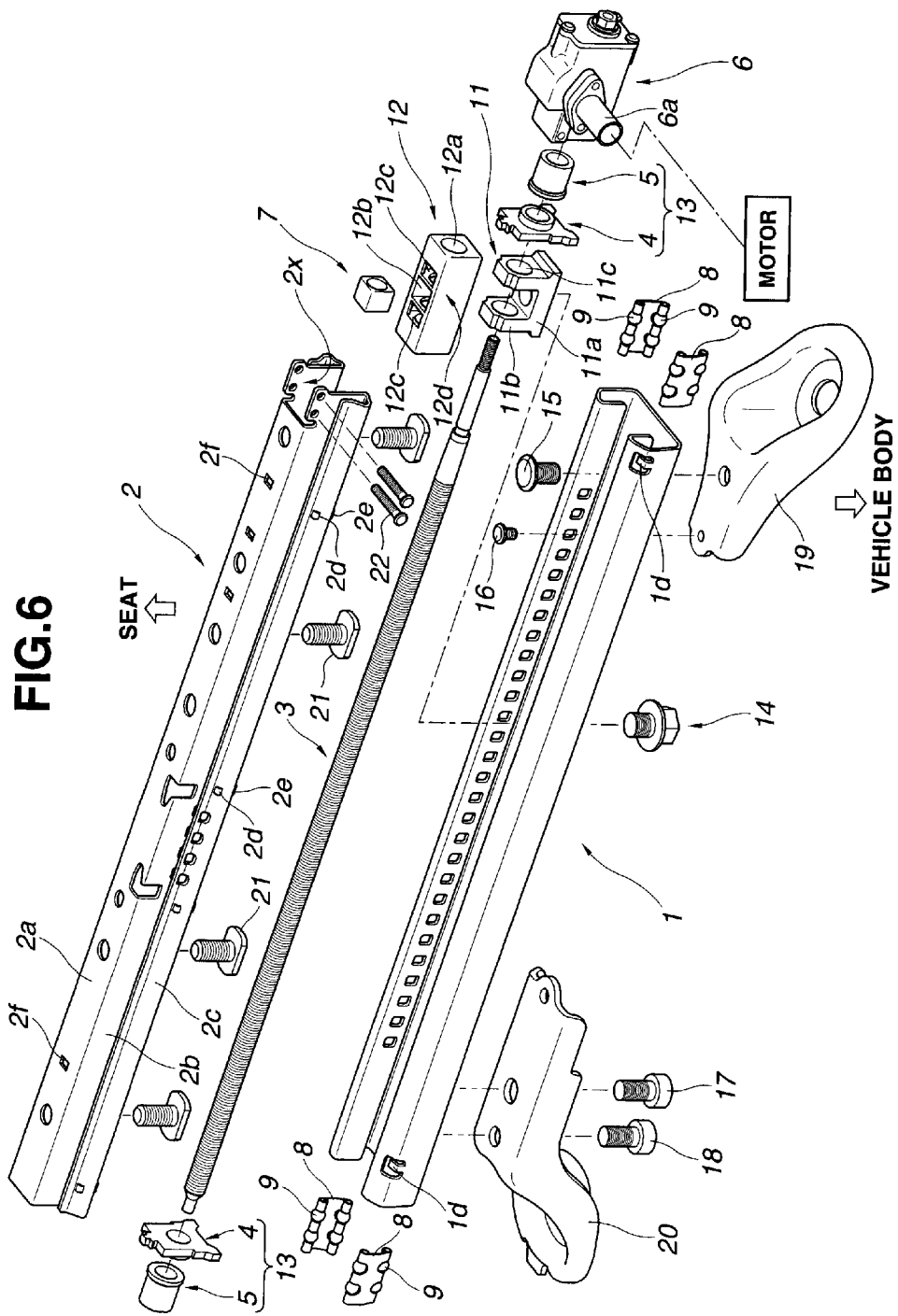
FIG. 6 is an exploded perspective view of the electrically operated seal slide apparatus of FIG. 1.

As shown in an exploded perspective view of FIG. 6, the electrically operated seat slide apparatus includes a lower rail 1 fixed to a floor surface of a vehicle body. An upper rail 2 is disposed inside the lower rail 1 so as to be slidable in a lengthwise direction of the upper rail 2. A seat (not shown) is connected to the upper rail 2. A screw shaft 3 is disposed inside the upper rail 2 and extends along the lengthwise direction of the upper rail 2. A nut7 is threadedly connected to the screw shaft 3 and connected to an inside portion of the lower rail 1. An electric motor is disposed to the upper rail 2 so as to rotationally drive the screw shaft 3. A gear box 6 is disposed around or coaxial with the axis of the screw shaft 3 to transmit the rotation of the motor upon reduction of the rotational speed of the motor, to the screw shaft 3. The gear box 6 is fixed to the upper rail 2.

The electrically operated seat slide apparatus as shown in FIG. 6 is disposed at each of left-side and right-side positions of the seat, so that two electrically operated seat slide apparatuses are symmetrically disposed though not shown. Accordingly, the front sections (or right end sections in FIG. 6) of the two electrically operated seat slide apparatuses are connected with each other with a connecting member (not shown). The motor (single motor) is disposed to the connecting member and has an output shaft which is connected to an input shaft (not shown) of each of the left-side and right-side gear boxes 6, the input shaft being disposed inside an input cylinder 6a of each gear box 6, so that two screw shafts 3 are rotationally driven in synchronism with each other.

Figure 7:
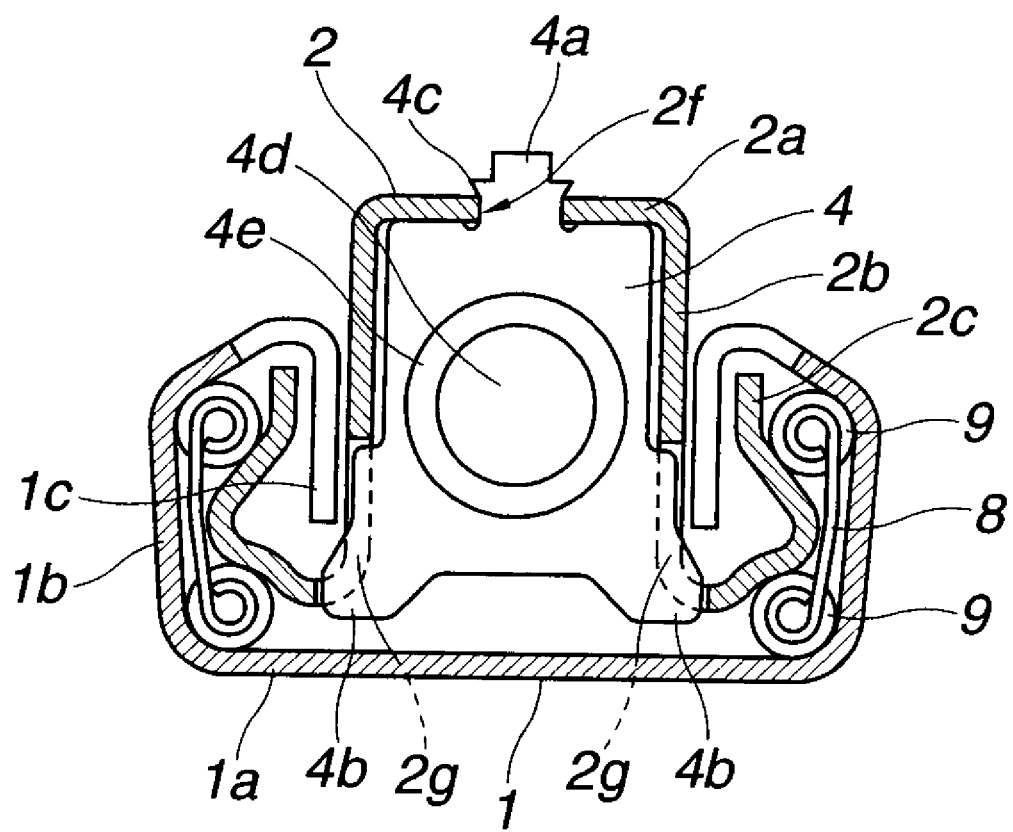
FIG. 7 is a transverse sectional view showing an essential part of the electrically operated seat slide apparatus of FIG. 1.

As shown in FIG. 7, the lower rail has a generally U-shape cross-section whose upper section is opened, and has a bottom wall section 1a, two side wall sections 1b which are respectively integral with the opposite side portions of the bottom wall section 1a and extend upward and bent inward at its upper portion, and two inner wall sections 1c which are respectively integral with the two side wall sections 1b and downward extend, each inner wall section 1c being formed by bending the upper portion of the side wall section 1b.

As shown in FIG. 6, foot sections 19, 20 are respectively connected to the opposite end sections of the lower rail 1 through bolts 15, 16, 17 and 18, and connected to the vehicle body floor surface. The upper rail 2 has a generally reversed U-shape cross-section whose lower part is opened and has an upper wall section 2a, two side wall sections 2b which are respectively integral with the opposite side portions of the upper rail 2 and extend downward, and two outer wall sections 2c which are respectively integral with the lower end portions of the two side wall sections 2b and extend upward upon being outwardly bent. The seat is connected to the upper rail 2 through four bolts 21. The upper rail 2 is engaged with the lower rail 1, in which each outer wall section 2c of the upper rail 2 is inserted between the side wall section 1b and the inner wall section 1c of the lower rail 1, so that the upper rail 2 is slidable in the lengthwise direction of the lower rail 1.

Four guides (no numerals) are disposed between the lower rail 1 and the upper rail 2. Each guide includes guide balls 9 which are rotatably retained by a retainer 8. As shown in FIG. 6, two front guides are disposed respectively at the left-side and the right-side of the front end section of the lower rail 1 while two rear guides are disposed respectively at the left-side and the right-side of the rear end section of the lower rail 1. The guide balls 9 of each guide are rotatably disposed between the side wall section 1b of the lower rail 1 and the outer wall section 2c of the upper rail 2 as shown in FIG. 7.

The screw shaft 3 is rotatably supported inside the upper rail 2 by fixing the gear box 6 to the upper rail 2. Specifically, the screw shaft 3 is rotatably disposed between the opposite two side wall sections 2b of the upper rail 2. As shown in FIG. 6, the rear end of the gear box 6 is installed to the front end portion of upper rail 2, in which the gear box 6 is connected to the upper rail 2 with two bolts 22.

The lower rail 1 is provided at its front and rear end sections with stationary stoppers 1d for the guides (including the guide balls 9) in order to prevent the guides from making their locational shifts and to prevent guide balls 9 from getting out of their positions Additionally, four pairs of movable stoppers 2d, 2e are formed projecting to the outer surface of the outer wall section 2c of the upper rail 2. The stopper 2d and the stopper 2e are respectively located at the upper and lower parts of the outer wall section 2c. Two pairs of the movable stoppers 2d, 2e are located in the front side of the upper rail 2 and spaced from each other, while the other two pairs of the movable stoppers 2d, 2e are located in the rear side of the upper rail 2 and spaced from each other. The retainer 8 of the front guides are disposed between the two pairs of movable stoppers 2d, 2e in the front side of the upper rail 2, while the retainers 8 of the rear guides are disposed between the two pairs of movable stoppers 2*d*, 2*e* in the rear side of the upper rail 2.

Figure 1:
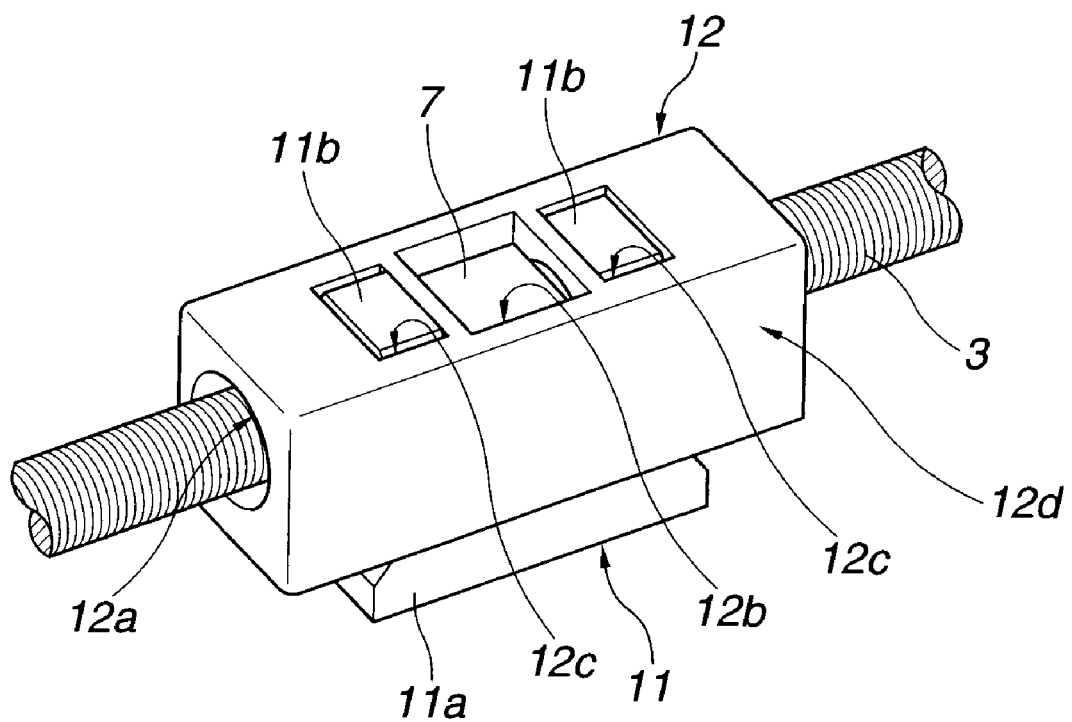
FIG. 1 is a perspective view of a configuration around a nut of an electrically operated seat slide apparatus according to the present invention.
Figure 2:
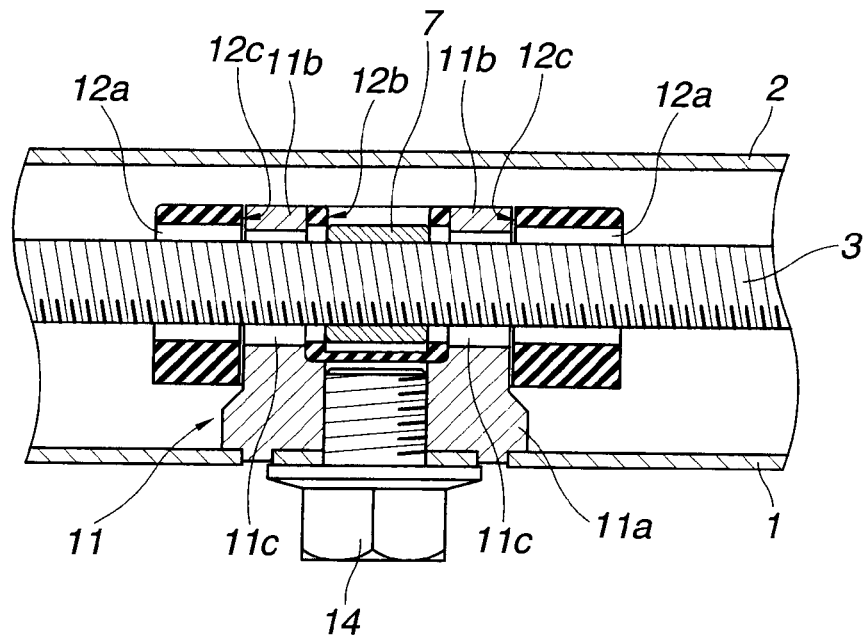
FIG. 2 is a fragmentary longitudinal sectional view of a configuration around the nut of the electrically operated seat slide apparatus of FIG. 1.

A configuration around the nut 7 will be discussed with reference to FIGS. 1 and 2. The nut 7 is connected to the lower rail 1 through a nut retaining member 11 and an elastic body 12. The nut retaining member 11 has an connecting section 11*a* which is disposed inside the lower rail 1 and engaged with a bottom wall of the lower rail 1, and two retaining sections 11*b* which are formed integral with and extend upward from the connecting section 11*a*, the retaining sections 1*b* being spaced from each other in a fore-and-aft direction of the vehicle body. Each of the retaining sections 11*b* is formed with a first insertion hole 11*c* through which the screw shaft 3 is inserted. The elastic body 12 is formed in the rectangular parallelepiped shape and formed with a second insertion hole 12*a* extending along the length of the elastic body 12, the screw shaft 3 being inserted in the second insertion hole 12*a*. The elastic body 12 is formed with a depression or hollow 12*b* opened to its upper surface, and additionally formed with two fitting spaces or through-holes 12*c* which are located on the opposite sides of the hollow 12*b* in a direction along the axis of the second insertion hole 12*a*. The nut 7 is to be fitted in the hollow 12*b*. The two retaining sections 11*b* of the nut retaining member 11 are to respectively inserted and fitted into the two fitting spaces 12*c* of the elastic body 12 from the lower side of the elastic body 12. The elastic body 12 is formed of rubber which has a Shore hardness of not less than A60, preferably not less than A70.

Figure 3:
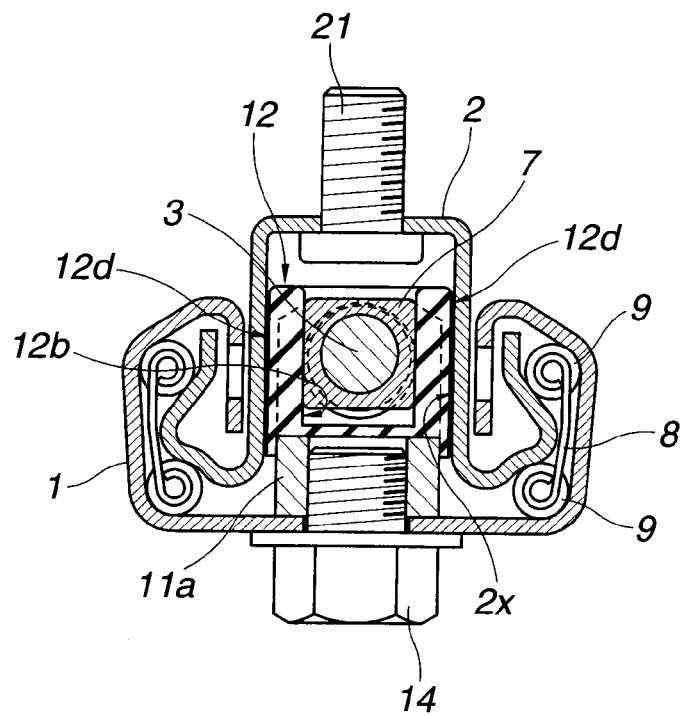
FIG. 3 is a transverse sectional view of a configuration around the nut of the electrically operated seat slide apparatus of FIG. 1.

The nut 7 is inserted and fitted into the hollow 12*b* of the elastic body 12 from the upper side of the elastic body 12, while the two retaining sections 11*b* of the nut retaining member 11 are inserted and fitted into the two fitting spaces 12*c* of the elastic body 12 from the lower side of the elastic body 12. The nut 7 is tightly fitted in the hollow 12*b* in the longitudinal direction (fore-and-aft directions) and in the lateral direction (left and right directions). The screw shaft 3 inserted in the first and second insertion holes 11*c*, 12*a* is screwed in the nut 7. The connecting section 11*a* of the nut retaining member 11 is connected to or engaged with the bottom wall section 1*a* of the lower rail 1 by the bolt 14 and located inside the lower rail 1. With the above configuration, as shown in FIG. 3, the opposite side surfaces 12*d* of the elastic body 12 with respect to a moving direction of the elastic body 12 respectively come close to the inner surfaces 2*x* of the two side wall sections 2*b* of the upper rail 2 so as to be slidable on or along the side wall sections 2*b* of the upper rail 2.

Figure 4:
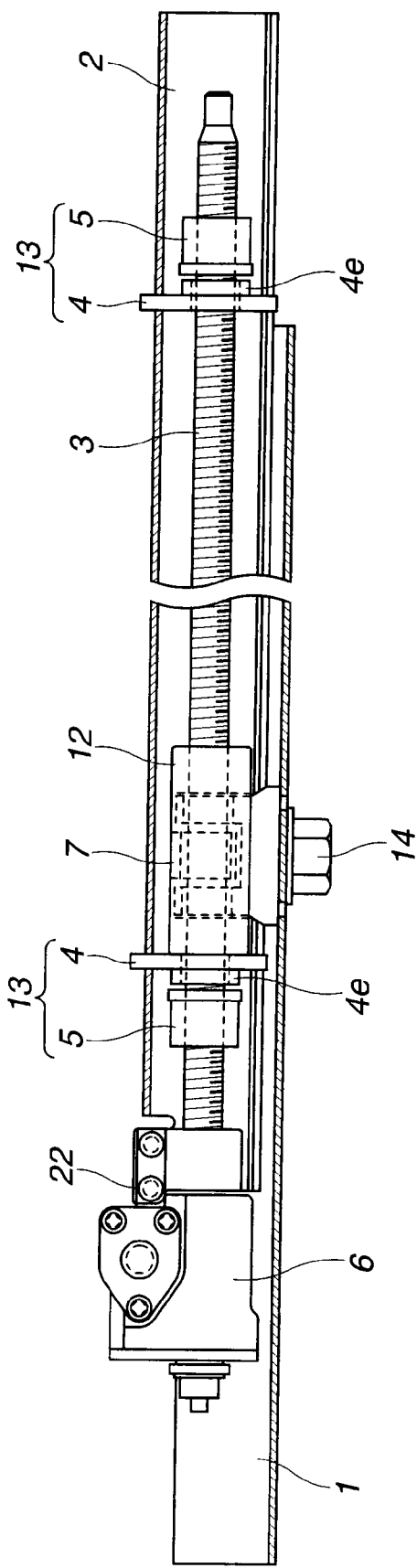
FIG. 4 is a longitudinal sectional view of the electrically operated seat slide apparatus of FIG. 1.
Figure 5:
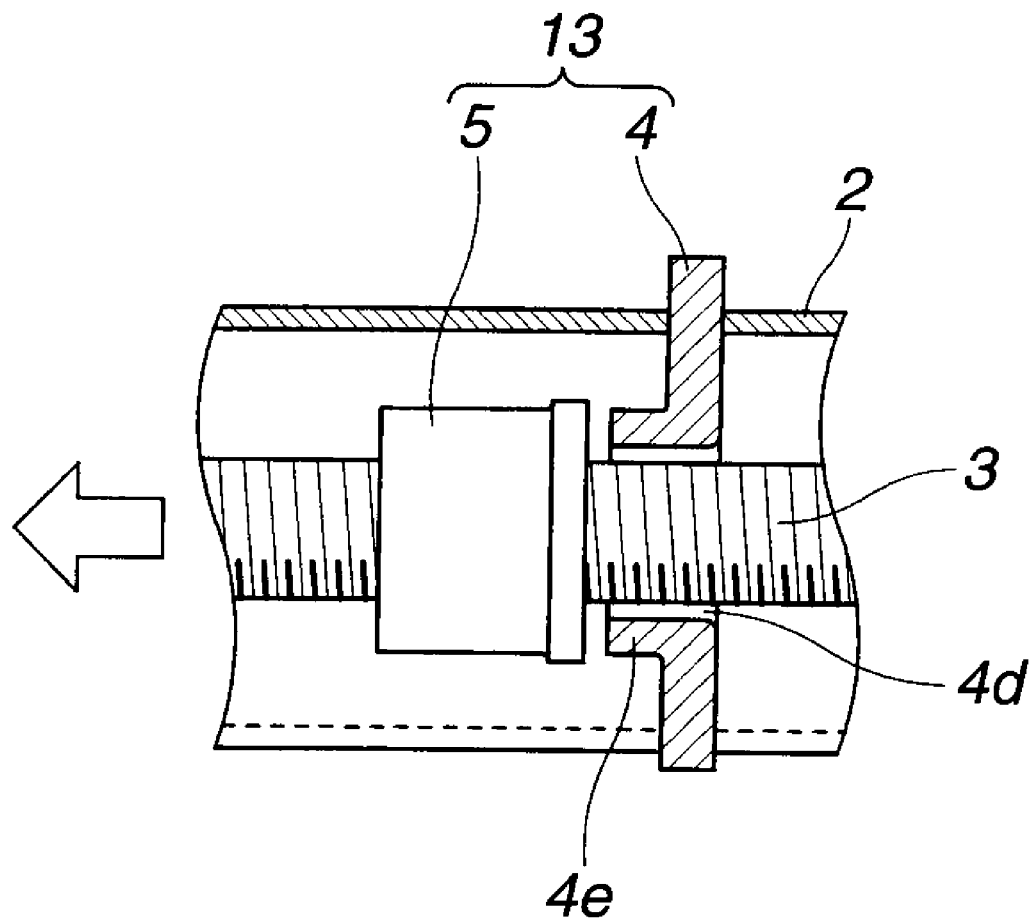
FIG. 5 is a fragmentary longitudinal sectional explanatory view showing operation of the electrically operated seal slide apparatus of FIG. 1.

As will be understood, when a collision of the vehicle occurs, an impact load is applied to the upper rail 2. In this regard, the electrically operated seat slide apparatus of the present invention is provided with an impact transmitting means or device 13 in order to prevent the impact load applied to the upper rail 2 from being transmitted to the screw shaft 3 through the gear box 6 connected to the upper rail 2 so as to allow the impact load applied to the upper rail 2 to be directly transmitted to the screw shaft 3 from the upper rail 2. As shown in FIGS. 4 and 5, the impact transmitting device 13 includes a reinforcement plate 4 whose major part is disposed inside the upper rail 2 and located perpendicular to the axis of the screw shaft 3, and a stopper 5 which is connected to or mounted on the screw shaft 3 at a position close to the reinforcement plate 4. This impact transmitting device 13 is disposed at two positions which are located on opposite sides of the elastic body 12 surrounding the nut 7, in a direction of the axis of the screw shaft 3, so that two impact transmitting devices 13 are disposed around the screw shaft 3 and spaced from each other along the length of the screw shaft 3.

Installation state of each reinforcement plate 4 will be discussed with reference to FIG. 7. The reinforcement plate 4 is provided at its upper central part with an upper projection 4*a*, and at its lower opposite side parts with respective lower projections 4*b*. The upper wall section 2*a* of the upper rail 2 is formed with an upper slit 2*f*, while the opposite two side wall sections 2*b* are respectively formed at their lower parts with lower slits 2*g*. The upper projection 4*a* is in engagement with the upper slit 2*f*, while the lower projections 4*b* are respectively in engagement with the lower slits 2*g*. The upper projection 4*a* projecting upward through the upper wall section 2*a* of the upper rail 2 is provided with two caulked portions 4*c* which are located at opposite side parts of the upper projection 4*a*.

The reinforcement plate 4 is formed at its central portion with a third insertion hole 4*d* in which the screw shaft 3 is inserted. It will be understood that a considerable strength is required for the reinforcement plate 4 because the reinforcement plate 4 is compressed in a vertical direction in FIG. 7 when the caulked portions 4*c* are formed, and the reinforcement plate 4 is pushed onto the stopper 5 when the impact load is applied to the upper rail as discussed above. In this regard, the reinforcement plate 4 is integrally provided with a cylinder section 4*e* which is formed around the third insertion hole 4*d* and projects along the axis of the screw shaft 3. The cylinder section 4*e* is located at a position opposite to the stopper 5. Additionally, in order to secure a considerable strength of the reinforcement plate 4 when the reinforcement plate 4 is pushed onto the stopper 5, the upper ends of the lower projections 4*b* are extended to the proximities of positions which vertically correspond to the center of the third insertion hole 4*d* in cross-section as shown in FIG. 7 so as to increase the vertical lengths of the lower projections 4*b*. Here, it will be understood that a sufficient clearance is formed between the screw shaft 3 and an inner surface defining each of the first, second and third insertion hole 11*c*, 12*a*, 4*d*.

The screw shaft 3 is inserted in the stopper 5, upon which the stopper 5 is caulked at its plural positions in such a manner that a load for caulking is applied in a direction from the outer peripheral section to the center axis of the stopper 5. Thus, the stopper 5 is caulked onto the screw shaft 3 and connected to the screw shaft 3.

With the above configuration, the elastic body 12 is movable between the two reinforcement plates 4, so that the two reinforcement plates 4 serve as stroke setting members for setting the moving stroke or range of the nut 7 and the elastic body 12.

Next, operation of the electrically operated seat slide apparatus will be discussed.

When the output shaft of the electric motor is rotated, the rotational speed of the output shaft is reduced by the speed-reduction device in the left-side and right-side gear boxes 6, upon which a rotational force from the motor is transmitted to the screw shafts 3 each of which is located inside the upper rail 2. Under rotation of the screw shaft 3, the nut 7 connected to the lower rail 1 relatively moves forward or rearward in the vehicle body along the screw shaft 3. Accordingly, the upper rail 2 moves forward or rearward in the vehicle body relative to lower rail 1. Then, when the end face of the elastic body 12 is brought into contact with either one of the reinforcement plates 4 at the front-side and rear-side in the vehicle body, the forward or rearward movement of the upper rail 2 is stopped. It is to be noted that the end face of the elastic body 12 is brought into contact with either one of the reinforcement plates 4 so as to stop the forward or rearward movement of the upper rail 2 before the movable stoppers 2d, 2e located at the central section of the upper rail 2 are contacted through the guides (8, 9) with the stationary stopper 1d located at the front or rear sections of the lower rail 1. In other words, the moving stroke of the upper rail 2 is set with positions at which the elastic body 12 are brought into contact with the reinforcement plates 4 at the front-side and rear-side in the vehicle body.

In case that an impact load in a direction toward the front of the vehicle body is applied to the upper rail 2 under a vehicle collision or the like, the reinforcement plate 4 located at the front-side in the vehicle body moves toward the front of the vehicle body and strikes against the stopper 5 located at the front-side in the vehicle body as shown in FIG. 5. Accordingly, the impact load cannot be directly transmitted from the upper rail 2 to the gear box 6 connected to the upper rail 2, thereby preventing the gear box 6 from receiving an impact load which acts to pull and separate the gear box 6 from the screw shaft 3 owing to the impact load applied to the gear box 6. At this time, a tension is applied to the screw shaft 3. In case that an impact load in a direction toward the rear of the vehicle body is applied to the upper rail 2, the reinforcement plate 4 located at the rear-side in the vehicle body strikes against the stopper 5 located at the rear-side in the vehicle body. Accordingly, the impact load can be prevented from being transmitted directly to the gear box 6 connected to the upper rail 2, thus avoiding a fear that the screw shaft 3 is compressed by the gear box 6 upon transmission of the impact load to the gear box 6. Also at this time, a tension is applied to the screw shaft 3.

In this embodiment, although a rotational force is applied to the nut 7 screwed on the screw shaft 3 upon rotation of the screw shaft 3, the rotation of the nut 7 is restricted by the elastic body 12 located at the sides of the nut 7. Additionally, when a force for axially moving the nut 7 is applied to the nut 7 under rotation of the screw shaft 3, the nut retaining member 11 and the lower rail 1 relatively move simultaneously with the movement of the nut 7 since the axial opposite sides of the nut 7 are retained with the retaining sections 11b through the elastic body 12. As a result, the upper rail 2 moves relative to the lower rail 1.

Since the side surfaces of the elastic body 12 are not covered with a metal material, no foreign noise is generated even upon contact of the side surfaces 12d of the elastic body 12 with the inner surfaces 2x of the two side wall sections 2b of the upper rail 2 during movement of the elastic body 12 inside and along the upper rail 2, while preventing a moving resistance from increasing under a sliding movement. Further, the screw shaft 3 is merely inserted in the first insertion holes 11c of the retaining sections 11b and the second insertion hole 12a of the elastic member 12, and the nut 7 is movable vertically and axially relative to the nut retaining member 11. As a result, even if the relative location of the nut retaining member 11 to the screw shaft 3 is shifted upon a relative movement of the lower rail 1 to the upper rail, this shift can be absorbed by vertical and axial movements of the nut 7 relative to the nut retaining member 11.

An assembling operation for connecting the nut 7 with the screw shaft 3 is completed merely by screwing the nut 7 upon inserting the screw shaft 3 into the second insertion hole 12a of the elastic member 12 to which the nut 7 and the nut retaining member 11 have been fitted, thus making an assembly workability high. Additionally, rotation of the nut 7 can be restricted by the elastic body 12 located at the sides of the nut 7, and therefore it is unnecessary to cover the side surfaces of the nut 7 with a metal material through the elastic member like in a conventional technique. Further, since the nut 7 is not covered with a metal material, the side wall sections 2b of the upper rail 2 is sufficient to have a width dimension between their inner surfaces 2x, to accommodate therebetween the elastic body 12. This can largely reduce the width dimension of the upper rail 2, thereby achieving small-sizing for the electrically operated seat slide apparatus.

In this embodiment, when a high rotational force is applied to the nut 7, the elastic body 12 located at the opposite sides of the nut 7 deform; however, the rotation of the nut 7 is supplementary restricted by the inner surfaces 2x of the side wall sections 2b of the upper rail 2 because the side surfaces of the elastic body 12 are in close proximity to the inner surface 2x of the side wall sections 2b of the upper rail 2.

In this embodiment, the nut 7 moves along the axis of the screw shaft 3 so that the nut retaining member 11 and the elastic body 12 movable with the nut 7 as a single piece are brought into contact with the reinforcement plate 4. During this operation, a damping action is developed because the end section of the elastic body 12 resides between the reinforcement plate 4 and the nut retaining member 11.

The elastic body 12 movable together with the nut 7 as a single piece is brought into contact with the reinforcement plate 4 thereby softening the impact of the nut 7, and therefore it is unnecessary to separately provide the reinforcement plate 4 with a damping member like in a conventional technique, while reducing the number of component parts and improving an assembly workability. Additionally, the reinforcement plate 4 is connected to the upper rail 2. As a result, in case that the gear box 6 for reducing the rotational speed of the motor is disposed around the axis of the screw shaft 3, an impact during a vehicle collision can be prevented from being directly applied through the screw shaft 3 to the gear box 6, which is different from a conventional technique in which a reinforcement plate (4) is connected to a screw shaft (3).

In this embodiment, the elastic body 12 is formed of a rubber. The rubber has a Shore hardness of not less than A60 which is a suitable hardness for the elastic body 12, so that parts (of the elastic body 12) located on the opposite sides of the nut 7 cannot readily deform. Additionally, when the elastic body 12 is brought into contact with the reinforcement plate 4, the deformation of the elastic body can be effectively suppressed thereby reducing dispersion of the stopping positions of the front-most and rear-most ends of the seat.

While the gear box has been shown and described as being disposed around the axis of the screw shaft or coaxial with the screw shaft in this embodiment, it will be understood that the gear box may be disposed remote from the axis of the screw shaft in such a manner that the output shaft of the gear box and the screw shaft are disposed parallel with each other and connected with each other through a pair of spur gears which are engaged with each other so that the gear box is relatively movable to the screw shaft while preventing an impact load from being applied through the gear box to the screw shaft. Further, the stroke setting member or reinforcement plate may be connected to the screw shaft without being connected to the upper rail. Furthermore, while the elastic body has been shown and described as being formed of the rubber, it may be formed of an elastic material other than rubber. Furthermore, the fitting spaces for the retaining sections 11b of the nut retaining member 11, of the elastic body 12 may be formed not to be opened to the upper surface of the elastic body 12.

In this embodiment, the reinforcement plate 4 has the cylinder section 4e which is formed integral with an annular disc-shaped main body of the reinforcement plate 4. Accordingly, when the caulked portions 4c are formed by downwardly compressing parts of the upper projection 4a projected outside the upper rail 2 after the upper projection 4a is engaged in the upper slit 2f of the upper rail 2 while the lower projections 4b are respectively engaged in the lower slits 2, the insertion hole 4d of the reinforcement plate 4 can prevented from being vertically crashed while the reinforcement plate 4 can be prevented from being buckled at the position of the insertion hole 4d. Additionally, when an impact load in a direction of the axis of the screw shaft 3 is applied to the upper rail 2, the reinforcement plate 4 can be prevented from being bent because the reinforcement plate 4 is integrally provided with the cylinder section 4e and therefore high in bending strength. This greatly improves a strength of the seat slide apparatus against the impact load.

In this embodiment, the upper ends of the lower projections 4b formed at the opposite lower sides of the reinforcement plate 4 are extended to the proximities of the positions which vertically correspond to the center of the third insertion hole 4d in cross-section, and therefore the lengths of the lower projections 4b fitted in the lower slits 2g are large. Accordingly, when an impact load in a direction of the axis of the screw shaft 3 is applied onto the upper rail 2, the reinforcement plate 4 cannot be deformed even upon the reinforcement plate 4 connected to the upper rail 2 being pushed against the stopper 5 connected to the screw shaft 3, thereby further increasing a strength of the seat slide apparatus against the impact load. Additionally, the reinforcement plate 4 is high in bending strength and therefore difficult to be bent.

In this embodiment, the stoppers 5 are disposed respectively outsides of the two reinforcement plates 4 between which the nut 7 intervenes in the direction along the screw shaft 3. Accordingly, when the upper rail 2 receives an impact load toward the vehicle body front, the reinforcement plate 4 located at the front-side in the vehicle body is brought into contact with the stopper 5 so that a tension is applied to the screw shaft 3. When the upper rail 2 receives an impact load toward the vehicle body rear, the reinforcement plate 4 located at the rear-side in the vehicle body is brought into contact with the stopper 5 so that a tension is applied to the screw shaft 3. Therefore, the screw shaft 3 can be prevented from undergoing a compression, so that buckling due to compression does not occur thus greatly improving the strength of the seat slide apparatus. Additionally, the two reinforcement plates 4 serve as the stroke setting members for setting the moving stroke or range of the nut 7, and therefore it is unnecessary to provide a separate stroke setting member thereby reducing the number of component parts.

In this embodiment, the cylinder section 4e of the reinforcement plate 4 faces or is opposite to the stopper 5 and therefore compresses the stopper 5 connected to the screw shaft 3, so that the reinforcement plate 4 is strong against its bending.

It will be understood that a configuration in which the upper end of each of the lower projections of the reinforcement plate does not extend to the proximity of the center of the insertion hole 4d in cross-section may be employed. Additionally, While the two stoppers 5 have been shown and described as being respectively disposed outside the two reinforcement plates 4 which are respectively located at positions between which the nut 7 intervenes, the stoppers may be respectively disposed inside the two reinforcement plates 4. Further, a configuration in which the two reinforcement plates do not serve as the stroke setting members for setting the moving stroke of the nut may be employed. Furthermore, a configuration in which the cylinder section 4e of the reinforcement plate 4 does not face the stopper 5 may be employed.

The entire contents of Japanese Patent Application No. 2008-089413, filed Mar. 31, 2008 and No. 2008-089414, filed Mar. 31, 2008 are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. An electrically operated seat slide apparatus comprising:
    a lower rail having a generally U-shape cross-section and fixed to a floor of a vehicle body;
    an upper rail having a generally reversed U-shape cross-section and slidably disposed to the lower rail, a seat being connected to the upper rail;
    a screw shaft disposed inside the upper rail and extending in a direction of length of the upper rail;
    a nut threadedly connected to the screw shaft and connected to the lower rail;
    a motor disposed to a side of the upper rail;
    a gear box located around an axis of the screw shaft and fixed to the upper rail to transmit a rotation of the motor to the screw shaft; and
    first and second plates disposed inside and connected to the upper rail to be perpendicular to an axis of the screw shaft, the first and second plates being respectively located at positions between which the nut intervenes in an axial direction of the screw shaft to set a moving range of the nut; and
    first and second stoppers respectively disposed outside the first and second plates in the axial direction of the screw shaft and located opposite to each other in the axial direction of the screw shaft.

2. An electrically operated seat slide apparatus as claimed in claim 1, wherein:
    the first plate is located at a front-side in the vehicle body, and the second plate is located at a rear-side in the vehicle body,
    when the upper rail receives an impact load toward a front of the vehicle body, the first plate is brought into contact with the first stopper so that a tension is applied to the screw shaft, and
    when the upper rail receives an impact load toward a rear of the vehicle body, the second plate is brought into contact with the second stopper so that a tension is applied to the screw shaft.

3. An electrically operated seat slide apparatus as claimed claim 1,
    wherein each of the first plate and the second plate includes comprises an upper part having an upper projection, and lower opposite side parts which respectively have lower projections,
    wherein the upper rail comprises an upper wall section formed with an upper slit, and opposite side wall sections each of which has a lower part formed with a lower slit,
    wherein the upper projection and the lower projections of the first plate are respectively fitted in the upper slit and the lower slits of the upper rail, wherein the upper projection has a projected portion projected over the upper wall section of the upper rail, the projected portion having a caulked portion, wherein each of the first plate and the second plate comprises an insertion hole through which the screw shaft is inserted, and a cylinder section located around the insertion hole.

4. An electrically operated seat slide apparatus as claimed in claim 3, wherein the lower projections have respective upper ends which extend to positions which correspond to a vertical center of the insertion hole in a plane perpendicular to the axis of the screw shaft.

5. An electrically operated seat slide apparatus as claimed in claim 3, wherein the cylinder section of the first plate projects towards the first stopper in the axial direction of the screw shaft, and the cylinder section of the second plate projects toward the second stopper in the axial direction of the screw shaft.

6. An electrically operated seat slide apparatus as claimed in claim 1, further comprising a nut retaining member which retains the nut through an elastic body and is connected to the lower rail,
wherein the nut retaining member comprises a connecting section connected to the lower rail and two retaining sections which extend upward from the connecting section and are spaced from each other in a fore-and-aft direction of the vehicle body, each of the two retaining sections comprising a first insertion hole through which the screw shaft is inserted,
wherein the elastic body is formed of an elastic block having a rectangular parallelepiped shape, the elastic body comprising:
a second insertion hole through which the screw shaft is inserted, the second insertion hole extending in a direction of length of the elastic body,
a section defining a hollow opened to a first surface of the elastic body, and
a section defining first and second fitting spaces which are located on opposite sides of the hollow in a direction along the second insertion hole,
wherein the nut is fitted in the hollow of the elastic body, and the two retaining sections of the retaining member are respectively fitted in the fitting spaces.

7. An electrically operated seat slide apparatus as claimed in claim 6, wherein the connecting section of the nut retaining member is located inside the lower rail and connected to an inner surface of the lower rail.

8. An electrically operated seat slide apparatus as claimed in claim 6, wherein the retaining sections of the nut retaining member are respectively fitted into the fitting spaces through a second surface of the elastic body, the second surface being opposite the first surface.

9. An electrically operated seat slide apparatus as claimed in claim 6, wherein the elastic body is formed of an elastomeric block.

10. An electrically operated seat slide apparatus as claimed in claim 6, wherein:
the upper rail comprises first and second side wall sections which are spaced from and face each other,
the elastic body comprises first and second side surfaces which are located on opposite sides of an axis of the second insertion hole, and
the first and second side surfaces of the elastic body are respectively in close proximity to the first and second side wall sections of the upper rail.

11. An electrically operated seat slide apparatus as claimed in claim 6, wherein the first and second plates are fixedly disposed inside the upper rail and respectively located on opposite sides of the nut, each of the first and second plates being perpendicular to an axis of the screw shaft and formed with a third insertion hole through which the screw shaft is inserted.

12. An electrically operated seat slide apparatus as claimed in claim 6, wherein the elastic body is formed of a rubber having a Shore hardness not less than A60.

13. An electrically operated seat slide apparatus as claimed in claim 1, wherein:
the first and second plates allow an impact load applied to the upper rail to be directly transmitted to the screw shaft so as to prevent the impact load from being transmitted through the gear box to the screw shaft, and
the first and second plates set a moving range of the nut.

14. An electrically operated seat slide apparatus comprising:
a lower rail having a generally U-shape cross-section and fixed to a floor of a vehicle body;
an upper rail having a generally reversed U-shape cross-section and slidably disposed to the lower rail, a seat being connected to the upper rail;
a screw shaft disposed inside the upper rail and extending in a direction of length of the upper rail;
a nut threadedly connected to the screw shaft and connected to the lower rail;
a motor disposed to a side of the upper rail;
a gear box located around an axis of the screw shaft and fixed to the upper rail to transmit a rotation of the motor to the screw shaft; and
first and second plates for allowing an impact load applied to the upper rail to be directly transmitted to the screw shaft so as to prevent the impact load from being transmitted through the gear box to the screw shaft, and for setting a moving range of the nut,
wherein the first plate is disposed inside and connected to the upper rail to be perpendicular to an axis of the screw shaft,
wherein the seat slide apparatus further comprises a first stopper connected to the screw shaft at a position near the first plate,
wherein the first plate comprises an upper part having an upper projection, and lower opposite side parts which respectively have lower projections,
wherein the upper rail comprises an upper wall section formed with an upper slit, and opposite side wall sections each of which has a lower part formed with a lower slit,
wherein the upper projection and the lower projections of the first plate are respectively fitted in the upper slit and the lower slits of the upper rail, wherein the upper projection has a projected portion projected over the upper wall section of the upper rail, the projected portion having a caulked portion,
wherein the first plate comprises an insertion hole through which the screw shaft is inserted, and a cylinder section located around the insertion hole.

15. An electrically operated seat slide apparatus comprising:
a lower rail having a generally U-shape cross-section and fixed to a floor of a vehicle body;
an upper rail having a generally reversed U-shape cross-section and slidably disposed to the lower rail, a seat being connected to the upper rail;
a screw shaft disposed inside the upper rail and extending in a direction of length of the upper rail;
a nut threadedly connected to the screw shaft and connected to the lower rail;
a motor disposed to a side of the upper rail;

a gear box located around an axis of the screw shaft and fixed to the upper rail to transmit a rotation of the motor to the screw shaft;

first and second plates for allowing an impact load applied to the upper rail to be directly transmitted to the screw shaft so as to prevent the impact load from being transmitted through the gear box to the screw shaft, and for setting a moving range of the nut; and a nut retaining member which retains the nut through an elastic body and is connected to the lower rail, wherein the nut retaining member comprises a connecting section connected to the lower rail and two retaining sections which extend upward from the connecting section and spaced from each other in a fore-and-aft direction of the vehicle body, each of the two retaining sections comprising a first insertion hole through which the screw shaft is inserted, wherein the elastic body is formed of an elastic block having a rectangular parallelepiped shape, the elastic body comprising:

a second insertion hole through which the screw shaft is inserted, the second insertion hole extending in a direction of length of the elastic body, a section defining a hollow opened to a first surface of the elastic body, and a section defining first and second fitting spaces which are located on opposite sides of the hollow in a direction along the second insertion hole, wherein the nut is fitted in the hollow of the elastic body, and the two retaining sections of the retaining member are respectively fitted in the fitting spaces.

* * * * *